May 6, 1924.　　　　　　　H. NICHOLS　　　　　　　1,492,740
VEHICLE WHEEL
Filed Nov. 2, 1921
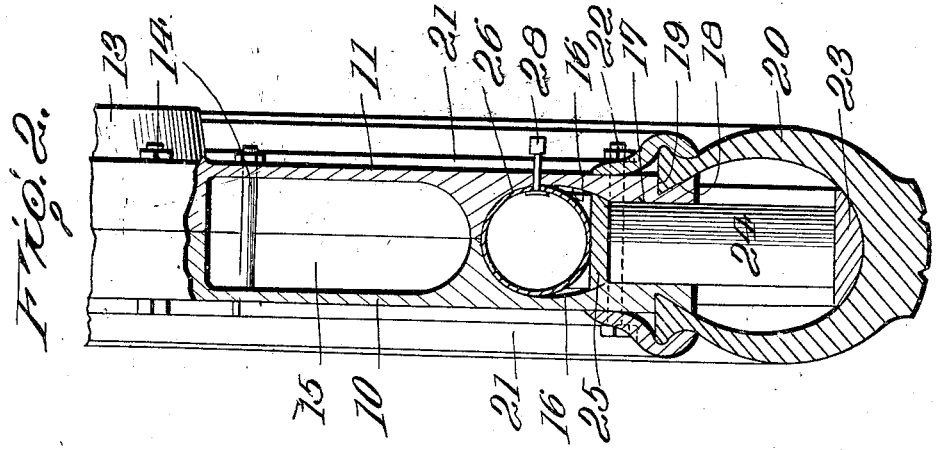
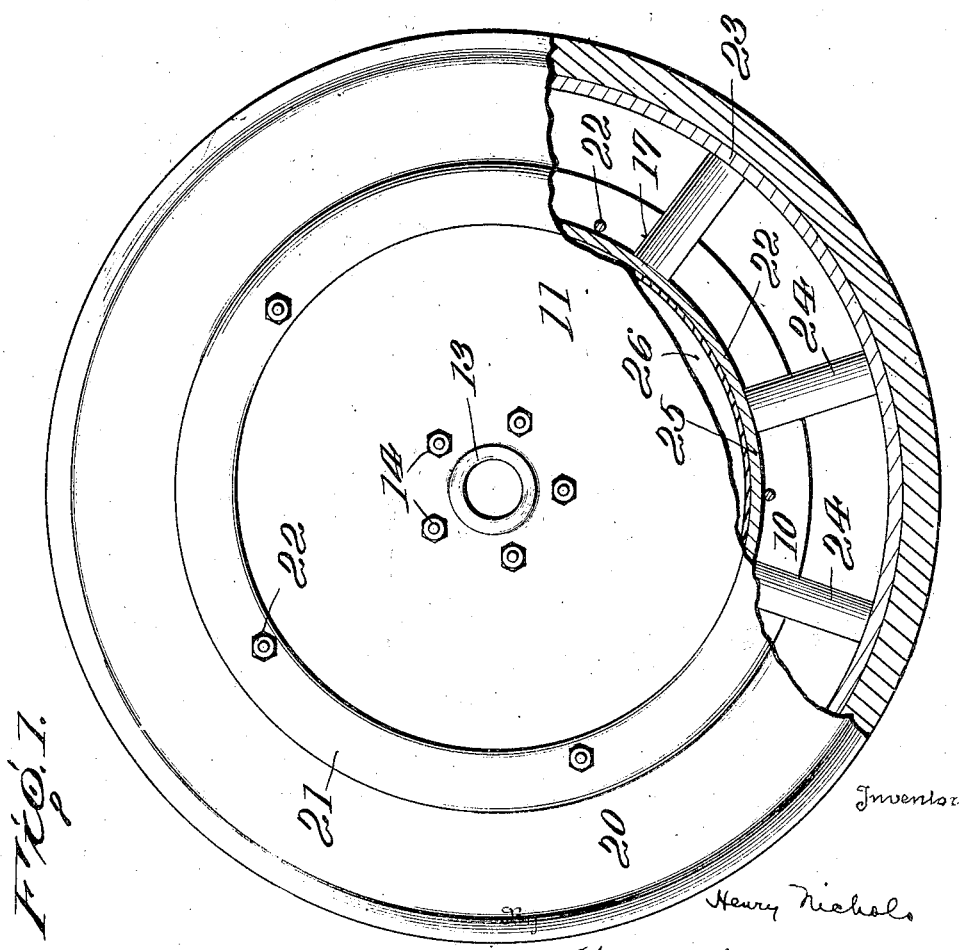

Patented May 6, 1924.

1,492,740

UNITED STATES PATENT OFFICE.

HENRY NICHOLS, OF NEW YORK, N. Y.

VEHICLE WHEEL.

Application filed November 2, 1921. Serial No. 512,279.

*To all whom it may concern:*

Be it known that I, HENRY NICHOLS, a citizen of the United States, residing at New York, in the county of New York and State of New York, have invented a new and useful Vehicle Wheel, of which the following is a specification.

This invention is a wheel of the type having means substituted for the standard pneumatic tire, for cushioning the shocks incident to travel.

One of the objects of the invention is to provide a wheel of simple construction, which will have all of the beneficial advantages of a wheel with the standard pneumatic tire, and yet not be subjected to the inconveniences which usually result from punctures and blowouts. A further object is to provide a wheel having means whereby a standard pneumatic shoe may be secured thereto, and means within the shoe for transmitting the road shocks around the same, the construction being such that the shoe will not collapse if punctured, and it may be worn almost completely through, without danger of failure to sustain the load. A further object is to provide a pneumatic cushion for the tire, so positioned that it will not be exposed to wear or contact with the road bed, and plungers interposed between said shoe and said cushion, whereby the road shocks are transmitted to said cushion. A further object is to provide means whereby pressure of any spoke or plunger on the cushion, due to the weight of the load, is transferred to the whole cushion, thereby equalizing the shocks and insuring a perfect balancing of the cushioning effect.

The invention will be hereinafter fully set forth and particularly pointed out in the claims.

In the accompanying drawing:—

Figure 1 is a side elevation illustrating a wheel constructed in accordance with the invention, parts being broken away. Figure 2 is a detail cross sectional view thereof.

Referring to the drawing, the wheel body is shown as constructed of two disk-like members 10 and 11, respectively, provided with registering central openings 13, forming the hub of the wheel. Said members are united by bolts 14, as shown. For the purpose of lightness the disks are so shaped as to provide a substantially large central chamber 15. Said members are also provided with complemental annular concavities, which, when said members are united, produce a concentric chamber 16, located near the periphery of the sections. Leading radially from the recess 16 are a plurality of guide openings 17.

The peripheral edges of the members 10 and 11 are provided with grooves 18, to receive the beads 19, of a standard pneumatic tire shoe 20. Said shoe is held in place by means of clamping rings 21, having complemental grooves to engage said beads, said rings being removably secured to the body members 10 and 11, by bolts 22.

Located within the shoe 20 and bearing against the inner surface of the tread portion thereof, is a metallic resilient equalizing ring 23, having a curved surface shaped to conform to the contour of said shoe, and also having a flat bearing surface facing the openings 17. Slidably mounted in said openings 17 are plungers 24, the outer ends of which bear against the resilient metallic ring 23. The inner ends of said plungers bear against a similar resilient equalizing ring 25, located in the chamber 16. The equalizing ring 25 is of elastic metal, and bears against a pneumatic rubber tube 26, also located in the recess 16. The said tube is inflated by means of an ordinary tire inflating pump, capable of engaging a valve 28 extending through the member 11. It will be noted that the side walls of the chamber 16 converge toward the peripheral median line contiguous to the openings 17, and that the side edges of the equalizing member 25 are shaped to conform to said walls. Thus the sides of the equalizing member will readily free themselves from engagement with the walls of the chamber when the plungers move inwardly, thereby overcoming any tendency of the equalizing member to stick.

In practice, the tube 26 is inflated to the desired pressure, approximating the same pressure that is used in the standard pneumatic tire. When the wheel is without load, the pressure of the air within said tube 26, acting against the ring 25, will force the plungers 24 outwardly, and thereby maintain the tire shoe 20 in a distended position by reason of the pressure of the plungers against the ring 23. When the wheel is under load, the pressure tends to force the plungers 24 inwardly, and this pressure is distributed around the wheel by means of the ring 23 in much the same manner as in the standard pneumatic tire. The inward pressure upon the plungers 24, is also communicated to the inner pressure ring 25, which tends to compress the tube 26. The pressure of any one plunger 24 upon the ring 25 is equalized by said ring, and is carried around the wheel and applied to the pneumatic tube 26, in much the same manner as the load is normally distributed in a standard pneumatic tire.

From the foregoing it will be readily understood that a very simple and inexpensive wheel is provided, so constructed that the parts may be readily separated, if necessary, for repairs and the like. A further advantage is that by placing the pneumatic tube 26 between the members 10 and 11, where it cannot be exposed to extraneous forces, except through the plungers 24 and ring 25, all of the beneficial advantages of a wheel provided with a standard pneumatic tire are obtained, yet the inconveniences which normally result from punctures and blowouts are avoided. Not only is this true, but the shoe may be worn almost completely through without danger of collapse, because it is sustained by the plungers 24 and spring rings 23 and 25, and air leaks therein can have no effect upon its operation. A further advantage lies in the fact that all shocks are quickly equalized around the whole wheel structure and danger of breaking down is reduced to a minimum.

Having thus explained the nature of the invention and described an operative manner of constructing and using the same, although without attempting to set forth all of the forms in which it may be made, or all of the forms of its use, what is claimed is:—

1. A wheel of the character described comprising a wheel body having an internal chamber and radially disposed openings communicating with said chamber, said chamber having converging side walls contiguous to said openings, a pneumatic cushion located in said chamber, an annular equalizing member also located within said chamber and having its side edges shaped to conform to the converging walls, said equalizing member being interposed between said cushion and the inner ends of said openings, said equalizing member being of a size to normally close said openings, plungers working in said openings and bearing at their inner ends against said equalizing member, and a tire shoe held in distended condition by the outer ends of said plungers.

2. A wheel of the character described comprising a wheel body having an internal chamber contiguous to its periphery and radially disposed openings communicating with said chamber, a pneumatic cushion located in said chamber, an annular equalizing member also located in said chamber and interposed between said cushion and the inner ends of said openings, said equalizing member being of a size to normally close said openings, radially disposed plungers slidably mounted in said openings and bearing at their inner ends against said equalizing member, a tire shoe, and flexible equalizing means engaged by the outer end of all of said plungers to hold said tire shoe distended.

In testimony whereof I have hereunto set my hand.

HENRY NICHOLS.